United States Patent Office.

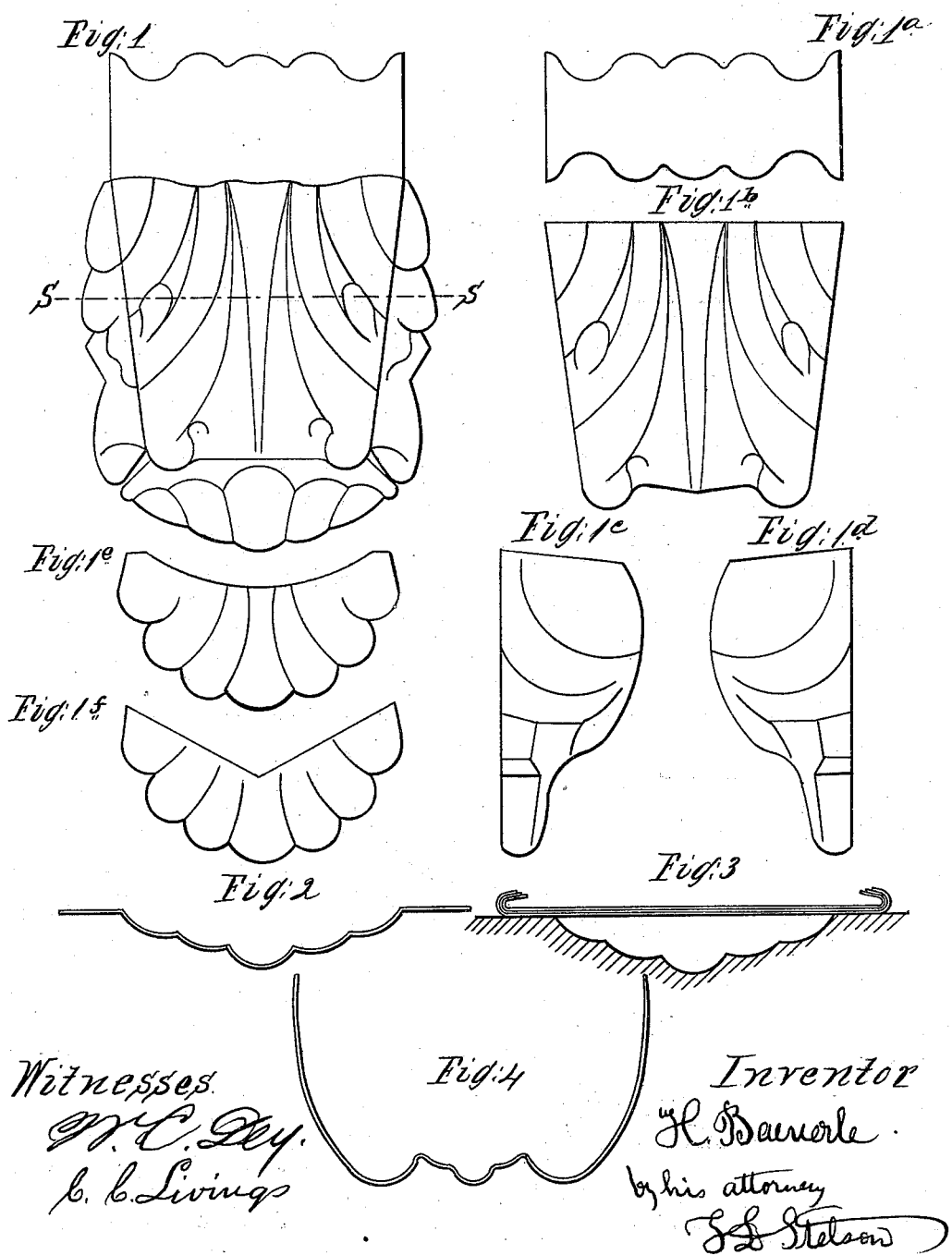

HERMAN BAEUERLE, OF NEW YORK, N. Y.

*Letters Patent No. 91,813, dated June 29, 1869.*

MODE OF CONSTRUCTING ARCHITECTURAL ORNAMENTS OF SHEET-METAL.

The Schedule referred to in these Letters Patent and making part of the same.

*To all whom it may concern:*

Be it known that I, HERMAN BAEUERLE, of the city and county of New York, in the State of New York, have invented certain new and useful Improvements in the Production of Metallic Ornaments; and I do hereby declare that the following is a full and exact description thereof.

My invention consists in the production of the rich decorative foliage and analogous ornamentation used under the brackets of cornices, and in analogous heavy out-door decoration, by striking up the same from sheet-metal in sections, and joining the sections together, to produce the ornaments, in the manner hereinafter set forth.

The ordinary mode of producing these ornaments is by casting them of zinc, by melting and pouring into moulds made for the purpose.

This process is tedious and expensive, and the quantity of material required is much greater than by my invention.

I strike up the ornaments in as many pieces as may be required to produce the figure.

The fact that the figures are large and often undercut, makes it desirable in most cases to employ three and often more separate pieces to complete an ornament, joining the several pieces by soldering along the adjacent edges.

Suppose it be a bracket, a modillion, or whatever may be the name of the supports of the overhang or cornice at the edge of the top of a fine city dwelling, and suppose the main part be made, as is now customary, of sheet-iron, galvanized or plated with zinc; and suppose it be required to ornament the front of each of these brackets with a symmetrical figure, representing a heavy leaf or collection of leaves, as in fig. 1; I divide the ornament into sections, as indicated by the blue lines, and prepare separate dies for each section, the female die being in each case iron, nicely shaped, and the male die being lead, or an alloy thereof, moulded therein. Then, having prepared sheet-zinc in pieces of the proper forms, but a little larger, I fix the female dies successively on the bed of a drop-press, and the lead dies in the hammer thereof, and strike the several pieces up into the proper swells and ridges by blows; then cut away the plane portion remaining along the edges, and solder the parts or sections together to produce the ornament.

I attach considerable importance to the manner of operating with the drop.

I first introduce three, or about three of the plates of zinc at once, and strike them into a condition approximating that desired, by dint of repeated heavy blows of the drop upon the combined mass.

To keep them in place properly, I bend over the corners one upon another.

After they are thus struck into nearly the right form, I separate them, and strike each again separately, as above suggested.

The accompanying drawings form a part of this specification.

Figure 1 is a front view of a bracket-ornament complete.

Figures 1$^a$, 1$^b$, &c., represent the several parts separately as completed before soldering together.

Figure 2 is a cross-section of a part on a larger scale before the plane portions left unaffected at the edges are removed.

Figure 3 is a cross-section of a collection of the pieces as prepared by holding together. They are shown as resting upon the female die ready to be struck in the collective mass, as above described.

Figure 4 is a cross-section of the entire ornament on the line $s\ s$, in fig. 1.

It will be observed that near the base of the ornament, the metal is, in effect, double in the finished ornament.

At other points, one section lies nearly at right angles to another.

I can put them at any angle to each other, which may be required in any given ornament.

I have spoken of sheet-zinc as the material, because I prefer this, but various other materials, including sheet-copper, may be used, if preferred.

I attach these ornaments in any approved manner, usually attaching them to the galvanized-iron cornices and brackets by soldering at a few points.

The rough striking of several sheets at once, as indicated in fig. 3, tends greatly to reduce the risk of breaking the metal in the process of striking.

By its aid, I am able to strike up the most elaborate designs very greatly swelled in front, and sidewise, upward and downward, in a small number of sections, and from sheet-zinc in its natural condition, just as it comes from the rolls.

Having now fully described my invention,

What I claim as new therein, and desire to secure by Letters Patent, is—

The manner of making metallic ornaments in one pair of moulds, by first striking three or four metal plates into a shape approximating that which is desired, by dint of repeated heavy blows of the drop upon the combined mass of plates, and then, by separating the plates and striking each again separately, substantially in the manner and for the purpose described.

In testimony whereof, I have hereunto set my name, in presence of two subscribing witnesses.

HERMAN BAEUERLE.

Witnesses:
C. C. LIVINGS,
W. C. DEY.